United States Patent
Qian et al.

(10) Patent No.: US 10,678,749 B2
(45) Date of Patent: Jun. 9, 2020

(54) METHOD AND DEVICE FOR DISPATCHING REPLICATION TASKS IN NETWORK STORAGE DEVICE

(71) Applicant: EMC IP Holding Company LLC, Hopkinton, MA (US)

(72) Inventors: Mark Yue Qian, Shanghai (CN); Yuan Luo, Shanghai (CN); Qiu Shang, Shanghai (CN); Xiyu Han, Shanghai (CN); David Changssheng Ren, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/993,852

(22) Filed: May 31, 2018

(65) Prior Publication Data

US 2018/0352028 A1 Dec. 6, 2018

(30) Foreign Application Priority Data

Jun. 2, 2017 (CN) .......................... 2017 1 0408932

(51) Int. Cl.
*G06F 15/173* (2006.01)
*G06F 16/11* (2019.01)
(Continued)

(52) U.S. Cl.
CPC .......... *G06F 16/119* (2019.01); *G06F 9/4868* (2013.01); *G06F 9/4881* (2013.01); *G06F 16/1824* (2019.01); *G06F 16/27* (2019.01); *H04L 67/1095* (2013.01); *H04L 67/14* (2013.01); *H04L 67/141* (2013.01); *H04L 67/143* (2013.01); *H04L 67/1097* (2013.01)

(58) Field of Classification Search
CPC .... G06F 16/119; G06F 16/1824; G06F 16/27; G06F 9/4868; G06F 9/4881; H04L 67/1095; H04L 67/1097; H04L 67/14; H04L 67/141; H04L 67/143
See application file for complete search history.

(56) References Cited

U.S. PATENT DOCUMENTS

| 7,546,364 B2 | 6/2009 | Raman et al. |
| 7,769,722 B1 | 8/2010 | Bergant et al. |

(Continued)

*Primary Examiner* — Ryan J Jakovac
(74) *Attorney, Agent, or Firm* — BainwoodHuang

(57) ABSTRACT

A method and device for dispatching replication tasks in a network storage device. For instance, a method of dispatching replication tasks in a network storage device includes: in response to receiving a request for replicating a plurality of sessions, dispatching a task for replicating a configuration session among the plurality of sessions to a first processing unit of the network storage device, the configuration session including configuration information describing a plurality of sessions; dispatching a plurality of tasks for replicating other sessions among the plurality of sessions except the configuration session to a plurality of second processing units different from the first processing unit; and in response to the first processing unit and the plurality of second processing units completing the respective tasks, aggregating results of replicating the plurality of sessions. With the technical solution of the present disclosure, processing efficiency can be improved and time can be saved.

20 Claims, 5 Drawing Sheets

(51) Int. Cl.
    *H04L 29/08*    (2006.01)
    *G06F 9/48*    (2006.01)
    *G06F 16/27*    (2019.01)
    *G06F 16/182*    (2019.01)

(56) References Cited

U.S. PATENT DOCUMENTS

| | | |
|---|---|---|
| 7,818,535 B1 | 10/2010 | Bono et al. |
| 8,037,345 B1 | 10/2011 | Iyer et al. |
| 8,285,758 B1 | 10/2012 | Bono et al. |
| 8,566,371 B1 | 10/2013 | Bono et al. |
| 8,706,833 B1 | 4/2014 | Bergant et al. |
| 8,996,837 B1 | 3/2015 | Bono et al. |
| 9,092,290 B1 | 7/2015 | Bono et al. |
| 9,304,999 B1 | 4/2016 | Bono et al. |
| 9,305,071 B1 | 4/2016 | Bono et al. |
| 9,424,117 B1 | 8/2016 | Bono et al. |
| 9,507,787 B1 | 11/2016 | Bono et al. |
| 9,805,105 B1 | 10/2017 | Bono et al. |
| 10,268,693 B1 | 4/2019 | Nanda et al. |
| 10,447,524 B1 | 10/2019 | Bono et al. |
| 2005/0149888 A1* | 7/2005 | Gunawardana ...... G06F 17/2755 716/103 |
| 2006/0294241 A1* | 12/2006 | Cherian ................ H04L 67/14 709/227 |
| 2010/0115332 A1* | 5/2010 | Zheng ................ G06F 11/1466 714/6.2 |
| 2010/0211544 A1* | 8/2010 | Chen ................ H04L 67/1095 707/622 |
| 2018/0109624 A1* | 4/2018 | Jayaraman ............ H04L 67/141 |

* cited by examiner

METHOD AND DEVICE FOR DISPATCHING REPLICATION TASKS IN NETWORK STORAGE DEVICE

RELATED APPLICATIONS

This application claim priority from Chinese Patent Application Number CN201710408932.3, filed on Jun. 2, 2017 at the State Intellectual Property Office, China, titled "METHOD AND DEVICE FOR DISPATCHING REPLICATION TASK IN NETWORK STORAGE DEVICE" the contents of which is herein incorporated by reference in its entirety.

FIELD

Embodiments of the present disclosure generally relate to a network storage device, and more specifically, to a method and device for dispatching replication tasks in a network storage device.

BACKGROUND

Currently, in the field of network storage devices, replication or restoration of sessions exists in many application scenarios. For example, when the network storage device performs master/slave switching, the network storage device is damaged, or other failover occurs, all the sessions need to be replicated according to the latest image.

The sessions that need to be replicated exist in one or more virtual data movers (VDM) provided in the network storage device. For instance, there are 10 sessions in the VDM. As the current design of replication operation does not allow group or parallel operation, the user can only perform replication operation to these sessions one by one with GUI or UemCli command. In face of such situations, the current design is complex and inefficient. A more simple and effective design is desired to avoid these problems.

SUMMARY

Embodiments of the present disclosure provide a method, a device and a corresponding computer program product for dispatching replication tasks in a network storage device.

In a first aspect of the present disclosure, there is provided a method of dispatching replication tasks in a network storage device. The method includes: in response to receiving a request for replicating a plurality of sessions, dispatching a task for replicating a configuration session among a plurality of sessions to a first processing unit of the network storage device, the configuration session including configuration information describing a plurality of sessions; dispatching a plurality of tasks for replicating other sessions among the plurality of sessions except the configuration session to a plurality of second processing units different from the first processing unit; and in response to the first processing unit and the plurality of second processing units completing the respective tasks, aggregating results of replicating the plurality of sessions.

In some embodiments, after dispatching the task for replicating the configuration session to the first processing unit of the network storage device, the task for replicating the configuration session is performed by the first processing unit through a finite state machine.

In some embodiments, after dispatching the plurality of tasks for replicating the other sessions to the plurality of second processing units different from the first processing unit, the plurality of tasks for replicating the other sessions are performed by the plurality of second processing units through respective finite state machines.

In some embodiments, dispatching a plurality of tasks for replicating other sessions among a plurality of sessions except the configuration session to the plurality of second processing units different from the first processing unit, includes: selecting, by polling the other sessions, a session that is not replicated from the other sessions; selecting a second processing unit that is not occupied from a plurality of second processing units; and dispatching a task for replicating the session to the second processing unit.

In some embodiments, other sessions are file system sessions.

In some embodiments, the plurality of sessions belong to the same virtual data mover.

In a second aspect of the present disclosure, there is provided an electronic device. The device includes: at least one processing unit; and at least one memory coupled to the at least one processing unit and storing machine-executable instructions, the instructions, when executed by the at least one processing unit, causing the device to perform acts, including: in response to receiving a request for replicating a plurality of sessions, dispatching a task for replicating a configuration session among a plurality of sessions to a first processing unit among at least one processing unit, the configuration session including configuration information describing a plurality of sessions; dispatching a plurality of tasks for replicating other sessions among a plurality of sessions except the configuration session to a plurality of second processing units different from the first processing unit; and in response to the first processing unit and the plurality of second processing units completing the respective tasks, aggregating results of replicating the plurality of sessions.

In a third aspect of the present disclosure, there is provided a computer program product being tangibly stored on a non-transient computer readable medium and including machine-executable instructions which, when executed, causing the machine to perform any step of the method described according to the first aspect or second aspect of the present disclosure.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

Through the following detailed description of the example embodiments of the present disclosure with reference to the accompanying drawings, the above and other objectives, features, and advantages of the present disclosure will become more apparent. In the example embodiments of the present disclosure, the same reference symbols usually refer to the same components.

DETAILED DESCRIPTION OF EMBODIMENTS

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

Figure 1:
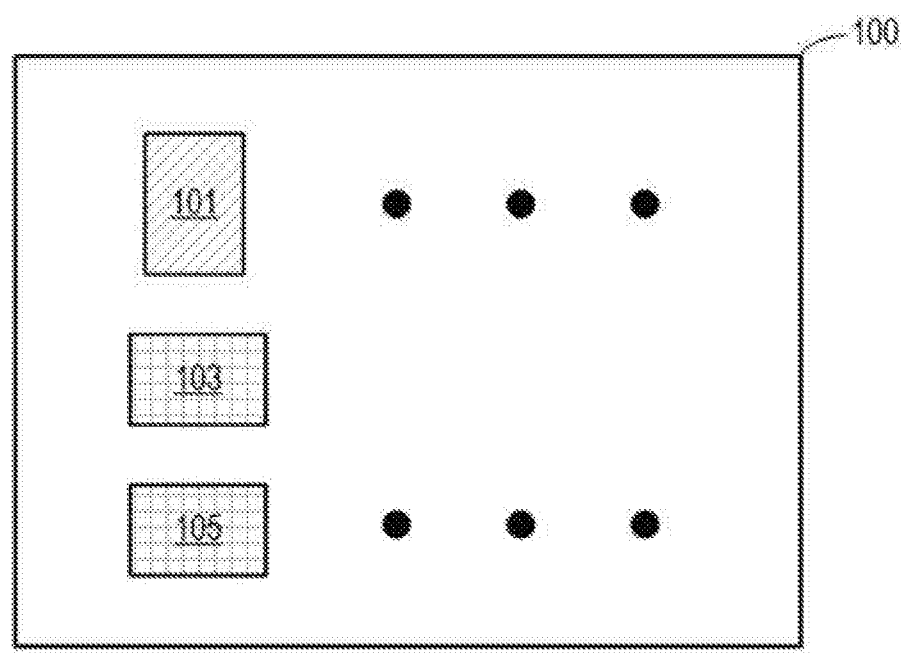
FIG. 1 illustrates a schematic diagram of a network storage device 100 according to the prior art.

FIG. 1 illustrates a schematic diagram of a network storage device 100 according to the prior art. In the network storage device 100, there are configured a plurality of virtual data movers (VDM), such as VDM 101, etc. Besides, the network storage device 100 further includes a plurality of processing units, including a first processing unit 103 and a plurality of second processing units 105. The sessions to be replicated exist in each VDM of the network storage device 100. Only as an example, it is assumed that there are 10 sessions in VDM 101. As the current design of replication operation does not allow group or parallel operation, the user can only perform replication operation to these sessions one by one with commands like GUI. Furthermore, as 500 sessions at most can be configured in a VDM in the current design, in face of such conditions, the current design is complex and inefficient and fails to make full use of each processing unit 103 and 105. At present, a parallel and group processing manner has not been proposed in the art, and a more simple and effective design is desired to avoid the above problems.

Figure 2:
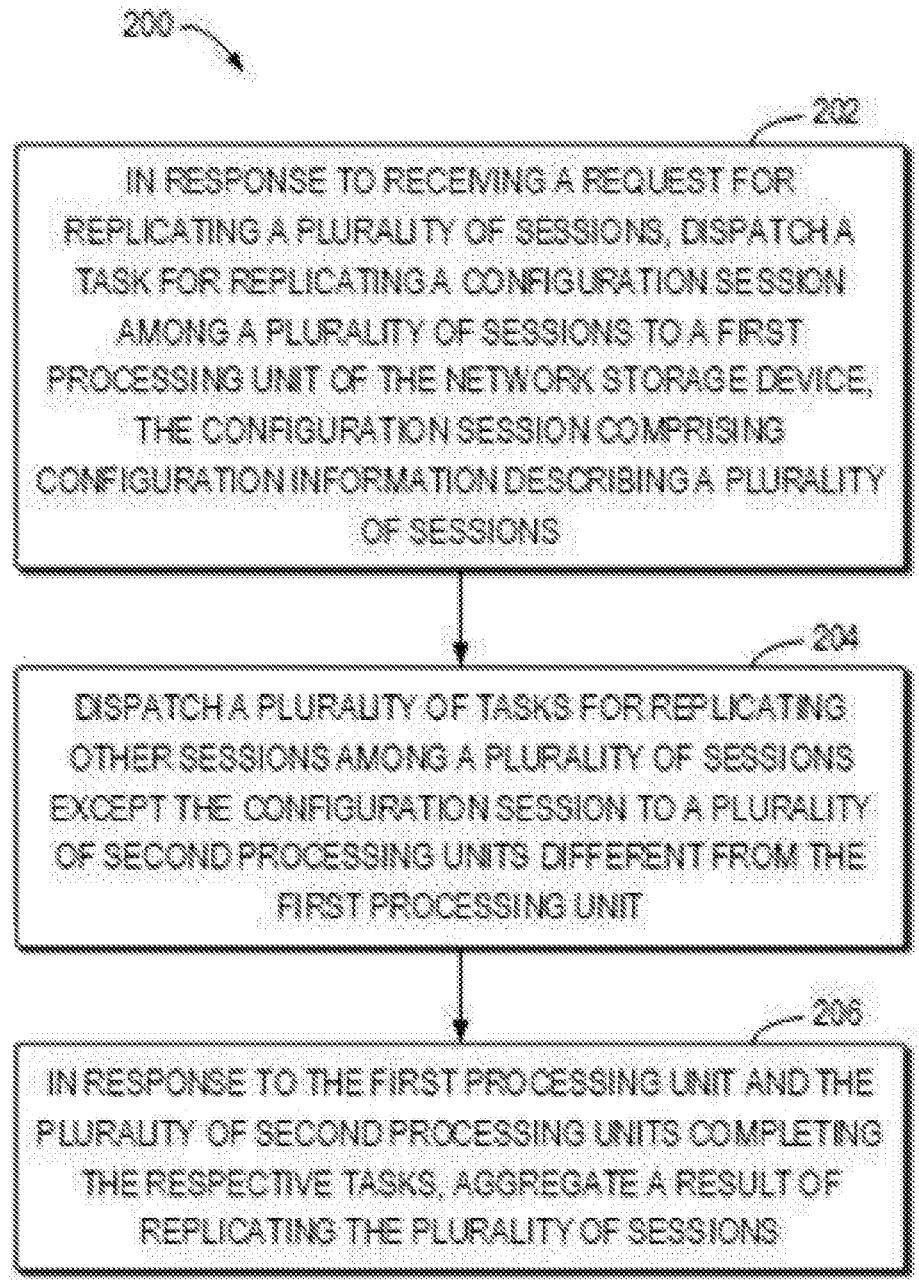
FIG. 2 illustrates a flowchart of a process or method for dispatching replication tasks in a network storage device according to the embodiments of the present disclosure.

To at least partially solve the above and other potential problems and defects, embodiments of the present disclosure provide a scheme for dispatching replication tasks in a network storage device. FIG. 2 illustrates a flowchart of a process or method 200 for dispatching replication tasks in a network storage device according to the embodiments of the present disclosure. In some embodiments, the method 200 may be implemented in the device shown in FIG. 5. Now referring to FIG. 1, the process or method 200 for session replication shown in FIG. 2 according to the embodiments of the present disclosure is depicted.

At 202, in response to receiving a request for replicating a plurality of sessions, the task for replicating the configuration session among the plurality of sessions is dispatched to the first processing unit 103 of the network storage device 100, the configuration session including configuration information describing a plurality of sessions. In some embodiments, the request for replicating a plurality of sessions is implemented with a certain VDM (such as VDM 101) in the network storage device 100. In other words, for instance, if VDM 101 is selected by the user to perform replication operation, then all the sessions in VDM 101 become sessions needed to be replicated.

In some embodiments, a configuration session for describing configuration information of sessions exists in the plurality of sessions in VDM 101. The VDM 101 is generally associated with the configuration session. In some embodiments, the user may first select a session to be replicated and other sessions in the same group can be collected based on the information included in the session. Furthermore, the task for replicating the configuration session among a plurality of sessions collected in the same group is dispatched to the first processing unit 103 in the network storage device 100.

In some embodiments, the first processing unit 103 may be a dedicated processing unit or a thread of the network storage device 100. In the present embodiment and other following embodiments, VDM 101 can be replaced by other virtual memory/processors in the network storage device 100. It shall be noted that after step 202 is implemented, the following step 204 may be implemented without waiting for the first processing unit 103 in the network storage device 100 to complete the replication task.

At 204, a plurality of tasks for replicating other sessions except the configuration session among the plurality of sessions are dispatched to a plurality of second processing units 105 different from the first processing unit 103. In some embodiments, when it is found that sessions in the same group as the above configuration session are not replicated, tasks for dispatching the sessions are dispatched to the second processing units 105 that are not occupied. As the replication operations implemented for the sessions are performed in parallel with that performed for the configuration session, namely, because the first processing unit 103 has been occupied, the second processing units 105 are different from the first processing unit 103.

In some embodiments, by polling other sessions, other sessions that are not replicated are sought for until all the sessions in the same group as the above configuration session are replicated. It shall be noted that a plurality of replication operations performed for other sessions except the configuration session are implemented in parallel, that is, for each dispatched replication task of a session, it is unnecessary to wait for the task to be completed to perform the next dispatching operation. Reference can be made to the depiction of FIG. 3 below for the specific dispatching manner in this step.

At 206, in response to the first processing unit 103 and the plurality of second processing units 105 completing their respective tasks, the results of replicating a plurality of sessions can be aggregated. In some embodiments, the respective task completion conditions of the first processing unit 103 and the plurality of processing units 105 are aggregated, for instance, replication success or replication failure, so as to perform the following-up processing according to the aggregation result. In some embodiments, the aggregation processing can be further performed by the first processing unit 103 that has completed replication operation for the configuration session. When the first processing unit 130 performs the aggregation processing, the plurality of second processing units 105 transmit their respective task completion condition to the first processing unit 130.

Figure 3:
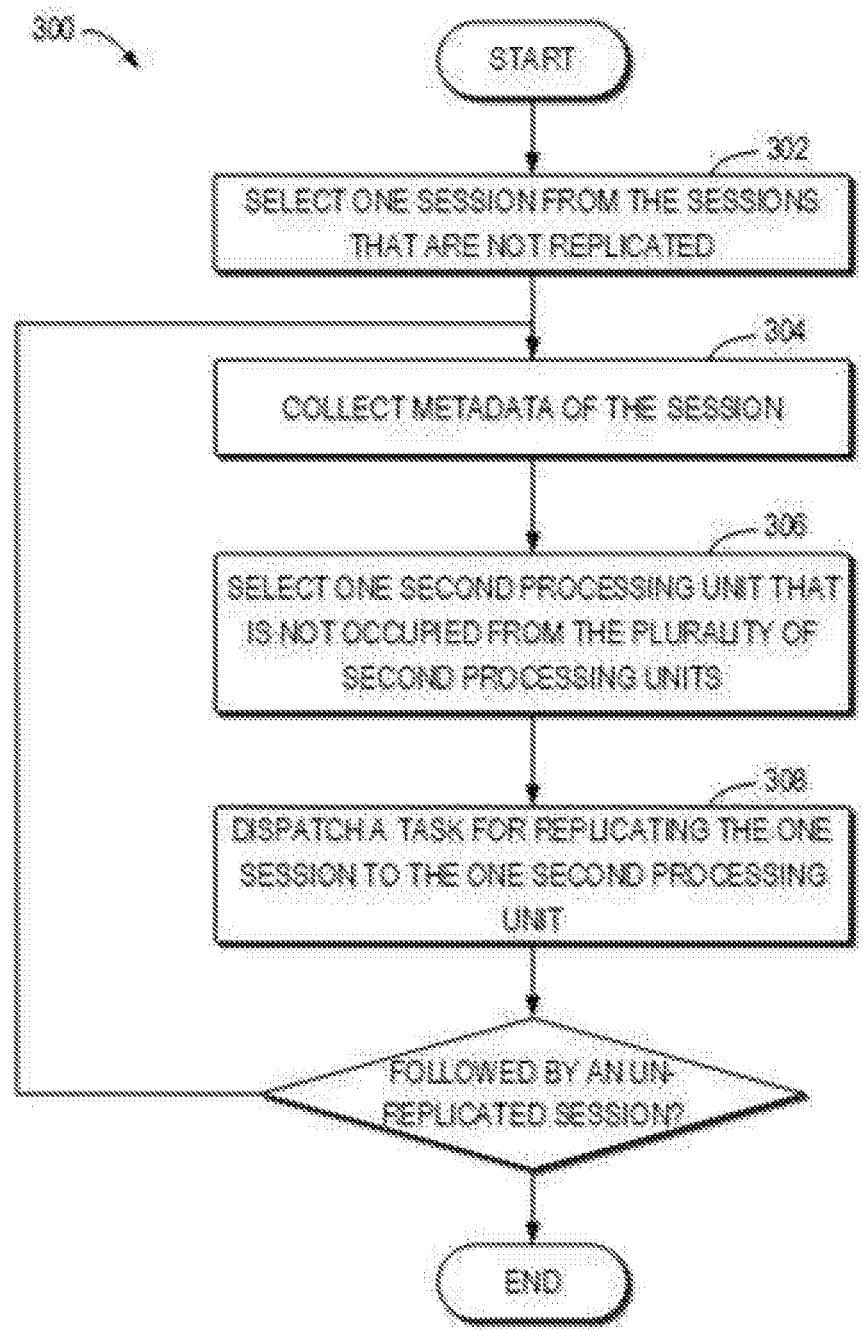
FIG. 3 illustrates a flowchart of a process or method for dispatching a plurality of tasks of other sessions except the configuration session according to the embodiments of the present disclosure.

FIG. 3 illustrates a flowchart of a process or method 300 for dispatching a plurality of tasks of other sessions except the configuration session according to the embodiments of the present disclosure. The essential point of the replication operation for the plurality of sessions described in the present disclosure is to dispatch the replication operations for the associated sessions.

At 302, one session that is not replicated is selected from other sessions. In some embodiments, one session that is not replicated is selected randomly from other sessions randomly. In some embodiments, one session that is not replicated is selected sequentially according to the particular information contained in each of the other sessions.

At 304, metadata of the session is collected. In some embodiments, the metadata may, for instance, include replication ID, replication name, replication role, and replication state, etc. The replication ID refers to a particular ID for representing the session. The replication name refers to the name for the session. The replication role is used to represent whether the network storage device is at a source side or destination side. The replication state indicates the state of the session. The metadata of the session (also referred to as parameters) is used to check whether the session should be performed with replication operation and to create an event for creating a business logic object (BLO).

At 306, one second processing unit that is not occupied is selected from the plurality of second processing units 105. In some embodiments, one second processing unit that is not occupied is selected randomly from the plurality of second processing units 105. In some embodiments, a processing unit that is not occupied is selected sequentially according to the particular information contained in each of the plurality of second processing units 105. In some embodiments, the second processing unit 105 may be a dedicated processing unit or a thread of the network storage device 100.

For example, in the current network storage device, there may exist many threads. Only as an example, there exist 128 threads. That is, when the number of sessions to be replicated is smaller than or equal to the number of threads, the replication tasks to be dispatched may be processed in parallel on a plurality of threads among 128 threads, and when the number of sessions to be replicated is larger than the number of threads, even though it is necessary to wait until there are idle threads, large amount of time can be saved. Crucially, the scheme of dispatching and processing in parallel replication tasks according to the present disclosure makes full use of processing resources in the network storage device without causing waste of time or resources.

At 308, the task for replicating a session is dispatched to a second processing unit 105. Then, it is checked whether there are other sessions that are not replicated. If yes, then the metadata for the session continues to be collected, and other processing units that are not occupied are selected to continue the replication task until all the sessions are replicated.

It shall be appreciated that the above task dispatching process will not affect the efficiency and performance of the whole method 200 because during the dispatching process, each thread (processing unit 103 and 105) performs their respective tasks in parallel.

The above FIG. 2 and FIG. 3 illustrate flowcharts for dispatching a plurality of replication tasks according to the embodiments of the present disclosure. It will be depicted below how to process the dispatched replication tasks with the processing thread in system resources in detail from the level of system resource.

Figure 4:
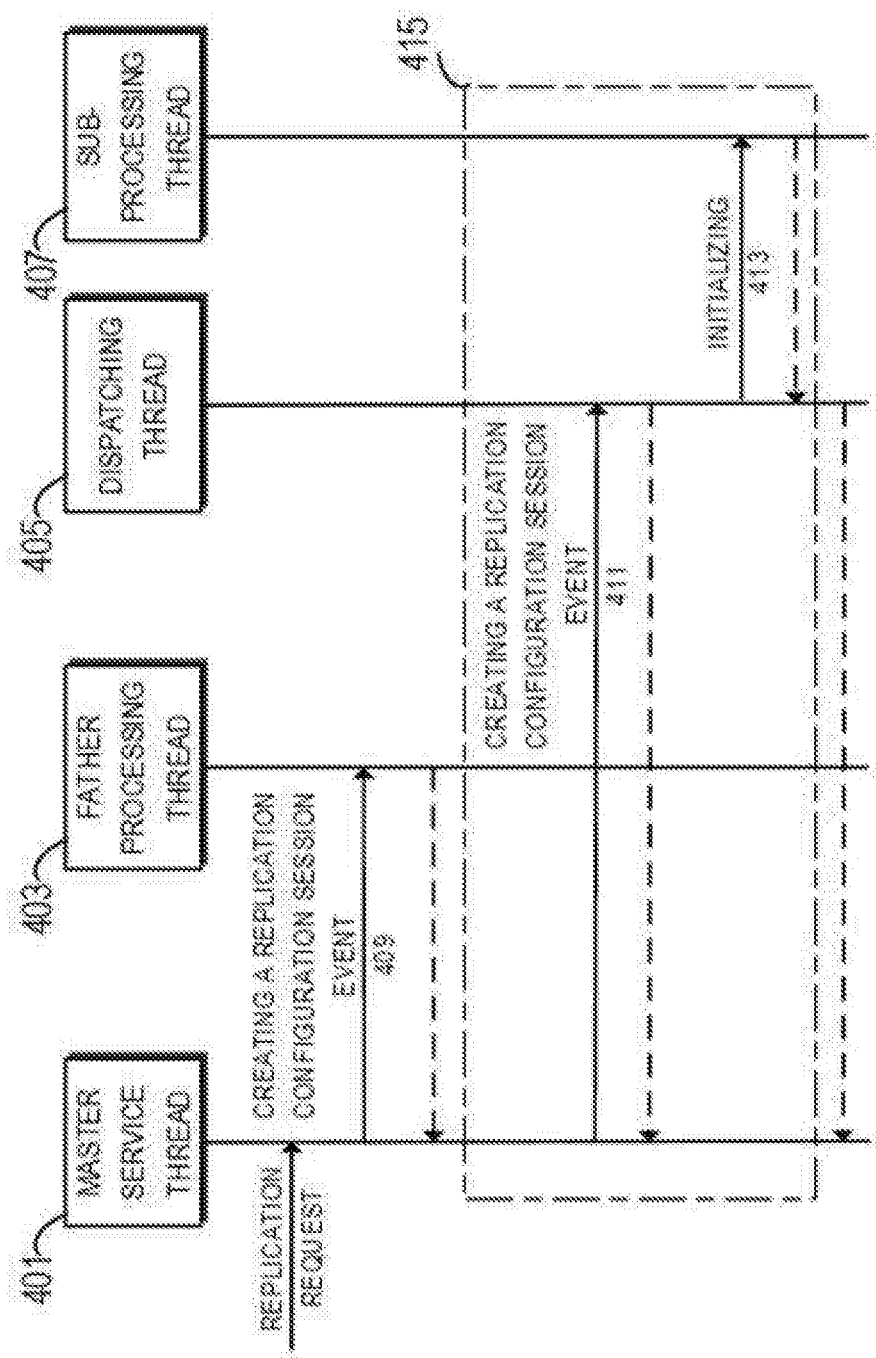
FIG. 4 illustrates a high-level pipeline diagram for dispatching and processing replication tasks in a network storage device according to the embodiments of the present disclosure.

FIG. 4 illustrates a high-level pipeline diagram for dispatching and processing replication tasks in a network storage device according to the embodiments of the present disclosure. After the replication request is received, a master service thread 401 creates 409 an event (namely, task) for replicating the configuration session to indicate a father processing thread (business logic object) 403 to process the created event. Only as an example, in a Dart module of EMC product, the replication request may be a DicXml asynchronous request, DicXml representing data of xml format processed by a Dart interconnect portion. When the father processing thread 403 completes the event, it transmits feedback to the master service thread 401. It is not necessary for the master service thread 401 to wait for the father processing thread 403 and it continues to create 411 events for replicating other sessions except the configuration session among the plurality of sessions to transmit them to a dispatching thread 405. Then, the dispatching thread 405 initializes 413 the business logic object (BLO) to dispatch it specifically to the sub-processing thread 407. The acts shown in dashed box 415 are operated cyclically until all the sessions are replicated.

Here, when the dispatching problem of group replication operations is solved, performance of group operations should be further considered. Therefore, the present disclosure introduces replication command service dispatching thread (namely, dispatching thread 405) and replication command service dispatching event, in order to support parallel processing of business logic objects at a plurality of sub-processing threads 407. In some embodiments, the replication command service dispatching thread 405 is a synchronous thread and each replication command service dispatching thread 405 is in charge of processing a corresponding replication command service dispatching event. In some embodiments, an internal asynchronous replication request is created according to metadata information in the replication command service dispatching event to serve as a replication request in each dispatching cycle.

When the dispatching thread 405 instructs the sub-processing thread 407 to process the specific dispatched task, the sub-processing thread 407 completes the whole instruction function through a finite state machine. When all the processing threads complete the dispatched replication tasks, the processing results are aggregated into the master service thread 401 and replication is completed.

Table 1 below illustrates comparison of technical effects of the conventional scheme and the embodiments of the present disclosure.

TABLE 1

| Test case | Conventional scheme | Embodiments of the present disclosure |
|---|---|---|
| One VDM, 200 failovers of file system sessions Source side: Unity 300 Destination side: Unity 300 | 2987 s | 137 s |
| One VDM, 10 synchronous failovers of file system sessions Source side: Unity 300 Destination side: Unity 300 | 254 s | 64 s |

Thus, the replication manner of the present disclosure reduces the processing time significantly, and the bigger the number of sessions is, the greater the saving extent will be.

Figure 5:
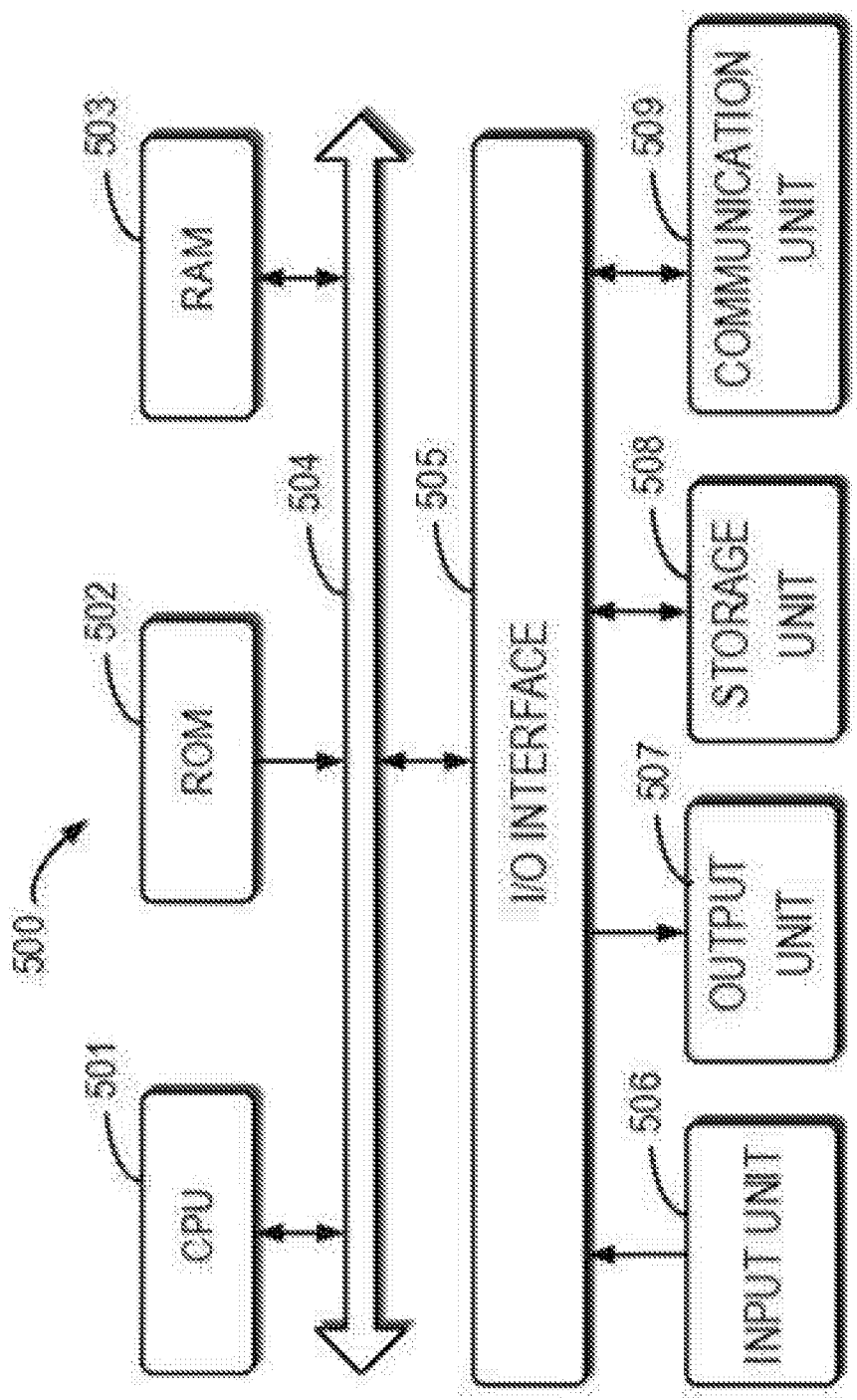
FIG. 5 illustrates a schematic diagram of a device for dispatching replication tasks in a network storage device according to the embodiments of the present disclosure.

FIG. 5 illustrates a schematic block diagram of an electronic device 500 that may be used to implement embodiments of the present disclosure. As illustrated, the device 500 includes a central processing unit (CPU) 501 which may perform various appropriate actions and processing according to the computer program instructions stored in a read-only memory (ROM) 502 or the computer program instructions loaded from a storage unit 508 into a random access memory (RAM) 503. The RAM 503 also stores all kinds of programs and data required by operating the storage device 500. CPU 501, ROM 502 and RAM 503 are connected to each other via a bus 504, to which an input/output (I/O) interface 505 is also connected.

A plurality of components in the device 500 are connected to the I/O interface 505, comprising: an input unit 506, such as keyboard, mouse and the like; an output unit 507, such as various types of display, loudspeakers and the like; a storage unit 508, such as magnetic disk, optical disk and the like; and a communication unit 509, such as network card, modem, wireless communication transceiver and the like. The communication unit 509 allows the device 500 to exchange information/data with other devices through computer networks such as Internet and/or various telecommunication networks.

Each procedure and processing described above, such as process 200, may be executed by a processing unit 501. As an example, in some embodiments, the method 200 may be implemented as computer software programs, which are tangibly included in a machine-readable medium, such as storage unit 508. In some embodiments, the computer program may be partially or completely loaded and/or installed to the device 500 via ROM 502 and/or the communication unit 509. When the computer program is loaded to RAM 503 and executed by CPU 501, one or more acts of the above described method 200 are implemented. Alternatively, in the other embodiments, CPU 501 may also be configured to execute the above described process in any suitable manner.

Generally, the various exemplary embodiments of the present disclosure may be implemented in hardware or application-specific circuit, software, logic, or in any combination thereof. Some aspects may be implemented in hardware, while the other aspects may be implemented in firmware or software executed by a controller, a microprocessor or other computing devices. When various aspects of the embodiments of the present disclosure are illustrated or described into block diagrams, flow charts, or other graphical representations, it would be appreciated that the block diagrams, apparatus, system, technique or method described here may be implemented, as non-restrictive examples, in hardware, software, firmware, dedicated circuit or logic, common software or controller or other computing devices, or some combinations thereof.

As an example, the embodiments of the present disclosure can be described in a context of machine-executable instructions which are included, for instance, in the program module executed in the device on a target real or virtual processor. Generally, a program module includes routine, program, bank, object, class, component and data structure and so on and performs a particular task or implements a particular abstract data structure. In the embodiments, the functions of the program modules can be combined or divided among the described program modules. The machine executable instructions for the program module can be executed locally or in a distributed device. In the distributed device, the program module can be located between the local and remote storage mediums.

The computer program code for implementing the method of the present disclosure may be complied with one or more programming languages. These computer program codes may be provided to a general-purpose computer, a dedicated computer or a processor of other programmable data processing apparatuses, such that when the program codes are executed by the computer or other programmable data processing apparatuses, the functions/operations prescribed in the flow chart and/or block diagram are caused to be implemented. The program code may be executed completely on a computer, partially on a computer, partially on a computer as an independent software packet and partially on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular sequence, it should not be understood that such operations are completed in a particular sequence as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular embodiment of a particular invention. In the present invention, some features described in the context of separate embodiments may also be integrated into a single implementation. On the contrary, various features described in the context of a single implementation may also be separately implemented in a plurality of implementations or in any suitable sub-group.

Compared with the prior art, embodiments of the present disclosure possess various advantages. For example, embodiments of the present disclosure enable updating signature of the session automatically after migration. The embodiments of the present disclosure may further enable updating the signature of the session automatically based on different scenarios and user's requirements so that the replication session in the network storage device can be maintained.

Through the above depiction and the teaching given by the drawings, many modifications and other implementations of the subject matter described herein can be realized by those skilled in the art related to the present disclosure. Therefore, it is to be understood that the embodiments of the present disclosure are not limited to the specific embodiments disclosed herein and the modifications and other implementations aim to be included in the scope of the present disclosure. Furthermore, though the above depiction and related drawings describe the example embodiments under the context of some example combinations of components and/or functions, it is to be realized that alternative embodiments provide different combinations of components and/or functions without departing from the scope of the present disclosure. In this respect, for example, other forms of combinations of components and/or functions different from those described explicitly above are also expected to be included in the scope of the present disclosure. Although specific terms are employed here, they are used in a general and descriptive sense rather than for limiting purpose.

We claim:

1. A method of dispatching replication tasks in a network storage device, comprising:
    in response to receiving a request for replicating a plurality of sessions, dispatching a task for replicating a configuration session among the plurality of sessions to a first processing unit of the network storage device, the configuration session comprising configuration information describing the plurality of sessions;
    dispatching a plurality of tasks for replicating other sessions among the plurality of sessions except the configuration session to a plurality of second processing units different from the first processing unit; and
    in response to the first processing unit and the plurality of second processing units completing the respective tasks, aggregating results of replicating the plurality of sessions;
    wherein dispatching a plurality of tasks for replicating other sessions among a plurality of sessions except the configuration session to the plurality of second processing units different from the first processing unit comprises:
    selecting, by polling the other sessions, a session that is not replicated from the other sessions;
    selecting a second processing unit that is not occupied from the plurality of second processing units; and
    dispatching a task for replicating the session to the second processing unit.

2. The method according to claim 1, wherein
    after dispatching the task for replicating the configuration session to the first processing unit of the network storage device, the task for replicating the configuration session is performed by the first processing unit through a finite state machine.

3. The method according to claim 1, wherein
    after dispatching the plurality of tasks for replicating the other sessions to the plurality of second processing units different from the first processing unit, the plurality of tasks for replicating the other sessions are performed by the plurality of second processing units through respective finite state machines.

4. The method according to claim 1, wherein the other sessions are file system sessions.

5. The method according to claim 1, wherein the plurality of sessions belong to a same virtual data mover.

6. An electronic device, comprising:
    at least one processing unit; and
    at least one memory coupled to the at least one processing unit and storing machine-executable instructions, the instructions, when executed by the at least one processing unit, causing the device to perform acts, comprising:
        in response to receiving a request for replicating a plurality of sessions, dispatching a task for replicating a configuration session among a plurality of sessions to a first processing unit among the at least one processing unit, the configuration session comprising configuration information describing the plurality of sessions;
        dispatching a plurality of tasks for replicating other sessions among a plurality of sessions except the configuration session to a plurality of second processing units different from the first processing unit; and
        in response to the first processing unit and the plurality of second processing units completing the respective tasks, aggregating results of replicating the plurality of sessions;
    wherein dispatching a plurality of tasks for replicating other sessions among a plurality of sessions except the configuration session to the plurality of second processing units different from the first processing unit comprises:
    selecting, by polling the other sessions, a session that is not replicated from the other sessions;
    selecting a second processing unit that is not occupied from the plurality of second processing units; and
    dispatching a task for replicating the session to the second processing unit.

7. The device according to claim 6, wherein
    after the task for replicating the configuration session is dispatched to the first processing unit among the at least one processing unit, the task for replicating the configuration session is performed by the first processing unit through a finite state machine.

8. The device according to claim 7, wherein
    after dispatching the plurality of tasks for replicating the other sessions to the plurality of second processing units different from the first processing unit, the plurality of tasks for replicating the other sessions are performed by the plurality of second processing units through respective finite state machines.

9. The device according to claim 7, wherein the other sessions are file system sessions.

10. The device according to claim 7, wherein the plurality of sessions belong to a same virtual data mover.

11. A computer program product tangibly stored on a non-transient computer readable medium and comprising machine executable instructions which, when executed, causes computerized circuitry to perform a method of
    in response to receiving a request for replicating a plurality of sessions, dispatching a task for replicating a configuration session among the plurality of sessions to a first processing unit of a network storage device, the configuration session comprising configuration information describing the plurality of sessions;
    dispatching a plurality of tasks for replicating other sessions among the plurality of sessions except the configuration session to a plurality of second processing units different from the first processing unit; and
    in response to the first processing unit and the plurality of second processing units completing the respective tasks, aggregating results of replicating the plurality of sessions;
    wherein dispatching a plurality of tasks for replicating other sessions among a plurality of sessions except the configuration session to the plurality of second processing units different from the first processing unit comprises:
    selecting, by polling the other sessions, a session that is not replicated from the other sessions;
    selecting a second processing unit that is not occupied from the plurality of second processing units; and
    dispatching a task for replicating the session to the second processing unit.

12. The computer program product according to claim 11, wherein
after a task for replicating the configuration session is dispatched to the first processing unit in the network storage device, the task for replicating the configuration session is performed by the first processing unit through a finite state machine.

13. The computer program product according to claim 11, wherein
after dispatching the plurality of tasks for replicating the other sessions to the plurality of second processing units different from the first processing unit, the plurality of tasks for replicating the other sessions are performed by the plurality of second processing units through respective finite state machines.

14. The computer program product according to claim 11, wherein the other sessions are file system sessions.

15. The computer program product according to claim 11, wherein the plurality of sessions belong to a same virtual data mover.

16. The method according to claim 1, wherein aggregating the results of replicating the plurality of sessions includes:
identifying a respective task completion condition for each session of the plurality of sessions, and
based on the respective task completion condition identified for each session, providing an aggregated result which indicates success or failure for replication of each session of the plurality of sessions.

17. The method according to claim 16, wherein identifying the respective task condition for each session of the plurality of sessions includes:
performing, by the first processing unit, an aggregation processing operating to receive a plurality of task completion conditions from the plurality of second processing units.

18. The method according to claim 1, wherein the first processing unit and the plurality of second processing units reside within the network storage device.

19. The device according to claim 7, wherein aggregating the results of replicating the plurality of sessions includes:
identifying a respective task completion condition for each session of the plurality of sessions, and
based on the respective task completion condition identified for each session, providing an aggregated result which indicates success or failure for replication of each session of the plurality of sessions.

20. The computer program product according to claim 11, wherein aggregating the results of replicating the plurality of sessions includes:
identifying a respective task completion condition for each session of the plurality of sessions, and
based on the respective task completion condition identified for each session, providing an aggregated result which indicates success or failure for replication of each session of the plurality of sessions.

* * * * *